US008559885B2

(12) United States Patent
Seelenfreund et al.

(10) Patent No.: US 8,559,885 B2
(45) Date of Patent: Oct. 15, 2013

(54) SYSTEM AND METHOD FOR MEASUREMENT OF PARAMETERS OF RADIO-FREQUENCY TRANSMISSION DEVICES

(75) Inventors: Marc Seelenfreund, Ra'anana (IL); Ronen Shor, Ramat Hasharon (IL); Yirmi Hauptman, Rishon LeZion (IL)

(73) Assignee: Accel Telecom Ltd., Tel-Aviv (IL)

( * ) Notice: Subject to any disclaimer, the term of this patent is extended or adjusted under 35 U.S.C. 154(b) by 281 days.

(21) Appl. No.: 13/087,185

(22) Filed: Apr. 14, 2011

(65) Prior Publication Data

US 2012/0264377 A1    Oct. 18, 2012

(51) Int. Cl.
*H04W 24/00* (2009.01)
*G01R 35/00* (2006.01)

(52) U.S. Cl.
USPC ............... 455/67.14; 455/67.11; 324/601; 324/615; 324/649

(58) Field of Classification Search
USPC ............ 455/67.11; 324/601–611, 629–648
See application file for complete search history.

(56) References Cited

U.S. PATENT DOCUMENTS

| | | | | |
|---|---|---|---|---|
| 3,731,186 | A | * | 5/1973 | Sadel ........................ 324/603 |
| 3,774,113 | A | * | 11/1973 | Chasek ..................... 455/226.4 |
| 4,890,333 | A | | 12/1989 | Delahaye et al. |
| 4,979,394 | A | * | 12/1990 | Higo et al. ................... 73/602 |
| 5,057,795 | A | * | 10/1991 | Napier ........................ 331/78 |
| 5,266,906 | A | * | 11/1993 | Inahashi .................... 330/149 |
| 5,524,281 | A | * | 6/1996 | Bradley et al. ........... 455/67.15 |
| 6,233,437 | B1 | | 5/2001 | Klenner |
| 6,731,161 | B1 | * | 5/2004 | O'Leary ....................... 330/2 |
| 6,766,164 | B1 | | 7/2004 | Funk et al. |
| 6,965,241 | B1 | * | 11/2005 | Liu et al. ................... 324/601 |
| 7,392,016 | B2 | | 6/2008 | Tsien et al. |
| 7,398,056 | B1 | | 7/2008 | Ebert et al. |
| 7,799,020 | B2 | * | 9/2010 | Shores et al. ................ 606/38 |
| 2003/0153273 | A1 | | 8/2003 | Ebert et al. |
| 2003/0208516 | A1 | * | 11/2003 | Ao et al. ................... 708/250 |
| 2005/0267716 | A1 | * | 12/2005 | Largey et al. .............. 702/191 |

(Continued)

FOREIGN PATENT DOCUMENTS

CN    1905494    1/2007
EP    1 175 114    1/2002

(Continued)

OTHER PUBLICATIONS

Agilent AN 1287-2, Exploring the Architectures of Network Analyzers, Application Note, Dec. 6, 2000, Agilent Technologies.*

(Continued)

*Primary Examiner* — Gennadiy Tsvey
(74) *Attorney, Agent, or Firm* — Pearl Cohen Zedek Latzer Baratz, LLP

(57) ABSTRACT

A system and method for measurement of parameters of radio-frequency transmission devices is introduced. The system includes a digital signal processing (DSP) unit and RF transmitter and receiver modules. The transmitter generates Gaussian white noise and transmits it to the device under test (DUT) input. The output of the DUT is connected to the receiver. Using DSP analysis on the output response of the DUT to white noise, the DUT transfer function is estimated using iterative LMS method. From the estimated transfer function all the parameters which are used to describe the device can be calculated such as: gain, flatness, phase and group delay, phase and group delay variations, frequency response, filters rejection etc.

6 Claims, 4 Drawing Sheets

(56) References Cited

U.S. PATENT DOCUMENTS

| | | |
|---|---|---|
| 2006/0072656 A1 | 4/2006 | Wiss et al. |
| 2006/0215744 A1 | 9/2006 | O'Neill |
| 2006/0229020 A1 | 10/2006 | Mlinarsky et al. |
| 2006/0256725 A1 | 11/2006 | Engel |
| 2007/0014254 A1* | 1/2007 | Chung et al. ............ 370/318 |
| 2007/0201414 A1 | 8/2007 | Desai et al. |
| 2007/0297537 A1 | 12/2007 | Luce |
| 2008/0240212 A1* | 10/2008 | Satou .................... 375/221 |
| 2009/0092177 A1* | 4/2009 | Dvorak et al. ........... 375/224 |
| 2009/0121749 A1* | 5/2009 | Roberts et al. .......... 327/105 |
| 2009/0264080 A1 | 10/2009 | Huang et al. |
| 2009/0316922 A1* | 12/2009 | Merks et al. ............ 381/60 |
| 2009/0319217 A1* | 12/2009 | Zelder .................... 702/106 |
| 2010/0040204 A1* | 2/2010 | Chen et al. .............. 379/3 |
| 2010/0123471 A1 | 5/2010 | Olgaard et al. |
| 2010/0208785 A1 | 8/2010 | Lindqvist et al. |
| 2011/0028109 A1* | 2/2011 | Nieto et al. ............ 455/115.2 |

FOREIGN PATENT DOCUMENTS

| | | | |
|---|---|---|---|
| EP | 1 701 466 | | 9/2006 |
| GB | 2349523 A | * | 11/2000 |
| JP | 2003101350 A | * | 4/2003 |
| WO | WO 2005/009064 | | 1/2005 |
| WO | WO 2008/031252 | | 3/2008 |
| WO | WO 2009/001434 | | 12/2008 |

OTHER PUBLICATIONS

Service Guide, Agilent Technologies 8719ET/20ET/22ET/8719ES/20ES/22ES Network Analyzers, Aug. 2006, Agilent Technologies.*

* cited by examiner

SYSTEM AND METHOD FOR MEASUREMENT OF PARAMETERS OF RADIO-FREQUENCY TRANSMISSION DEVICES

FIELD OF THE INVENTION

The present invention relates to systems and method for measuring parameters radio-frequency transmission devices, more particularly, to systems and method for measuring parameters of radio-frequency transmission devices using digital signal processing.

BACKGROUND OF THE INVENTION

In order to use radio-frequency (RF) devices in advanced RF networks (such as third generation (3G) and Long Term Evolution (LTE) cellular networks), the devices must undergo compliance testing to assure that the devices will function correctly within the network and will not introduce interferences into the network.

Such compliance tests are performed by using dedicated test equipment (such as the Agilent VSA and ESG) which is highly complex and incorporates a lot of high-end RF circuitry.

The dedicated test equipment is based on high quality receiver and transmitter components which receive and transmit RF transmissions across the entire scope of the different cellular standards. Therefore, each transmission configuration requires its own RF chain which is unique for this specific configuration and differs from other configurations by frequency ranges, bandwidths, amplitudes etc.

FIG. 1a of the prior art is a schematic block diagram of a transmitting path 610' of a prior art test equipment.

The Tx Data 606' is input to a Tx hardware path block 600' containing several Tx paths each of which is a full hardware RF transmitter of a specific standard such as a Tx CDMA path 601', a Tx WCDMA path 602', a Tx GSM path 603', a Tx GPRS path 604', and a Tx WiFi path 605'. The Tx hardware path block 600' outputs the Tx Data 606' through the hardware path selected to be tested to a Tx RF front end 607' which in turn, transmits its output out of the prior art test equipment.

FIG. 1b of the prior art is a schematic block diagram of a receiving path 610" of a prior art test equipment.

In the receiving path 610", a Rx RF front end 607" receives a transmission from outside the prior art test equipment and inputs it to a Rx hardware path block 600" containing several Rx paths each of which is a full hardware RF receiver of a specific standard such as a Rx CDMA path 601", a Rx WCDMA path 602", a Rx GSM path 603", a Rx GPRS path 604", and a Rx WiFi path 605". The Rx hardware path block 600" outputs a Rx data 606" for analysis by the prior art test equipment.

Such dedicated test equipment is very accurate but in many case such accuracy may be excessive and lower accuracy (and much less complex) test equipment can be used.

Using a digital processing software to emulate the different RF transmission signals can help to lower the complexity of the test equipment by eliminating the multitude of RF chains in the dedicated test equipment and thereby simplifying the design of the test equipment.

Using Digital signal processing software any additional transmission configuration (i.e modulation, networking etc.) can be added without the need for multiple hardware RF chains and hardware transceivers.

None of the prior art devices comprises all of the above characteristics and functions.

There is therefore a need for a system and method for measurement of parameters of radio-frequency transmission devices by utilizing a digital signal processing techniques, which comprises a combination of all of the above characteristics and functions.

SUMMARY OF EMBODIMENTS OF THE INVENTION

The background art does not teach or suggest a system and method for measurement of parameters of radio-frequency transmission devices by utilizing a DSP.

The present invention overcomes these deficiencies of the background art by providing a system and method for measurement of parameters of radio-frequency transmission devices where instead of using multiple hardware RF chains and digital radios (one radio for each technology to be tested), a DSP is used to emulate the digital radios and different RF configurations' receive and transmit signals.

According to the teaching of the present invention there is provided a system for measurement of parameters of radio-frequency transmission devices including: a radio-frequency transmission emulator; an input power attenuator, wherein the input power attenuator is operatively connected to the radio-frequency transmission emulator; a device under test, wherein the device under test is operatively connected to the input power attenuator; and an output power attenuator, wherein the output power attenuator is operatively connected to the device under test and to the radio-frequency transmission emulator.

According to the teaching of the present invention the system for measurement of parameters of radio-frequency transmission devices further including: an input relay, wherein the input relay is operatively connected to the input power attenuator and to the device under test; an output relay, wherein the output relay is operatively connected to the device under test and to the radio-frequency transmission emulator; and a bypass connection operatively connected to the input relay and to the output relay.

According to the teaching of the present invention the radio-frequency transmission emulator including: a transfer function estimator; a radio-frequency module transmit, wherein the radio-frequency module transmit is operatively connected to the transfer function estimator; a radio-frequency transmission emulator output port, wherein the radio-frequency transmission emulator output port is operatively connected to the radio-frequency module transmit; a radio-frequency transmission emulator input port; a radio-frequency module receive, wherein the radio-frequency module receive is operatively connected to the radio-frequency transmission emulator input port and to the transfer function estimator; and a main controller, wherein the main controller is operatively connected to the transfer function estimator by a transfer function estimator control line, to the radio-frequency module transmit by a radio-frequency module transmit control line, to the input relay by an input relay control line, to the output relay by an output relay control line, and to the radio-frequency module receive by a radio-frequency module receive control line.

According to the teaching of the present invention the radio-frequency module receive including: a receive radio-frequency switch; a receive gain control, wherein the receive gain control is operatively connected to the receive radio-frequency switch; a receive precision amplifier, wherein the receive precision amplifier is operatively connected to the receive gain control; a receive down converter, wherein the receive down converter is operatively connected to the receive precision amplifier; and a receive controller, wherein the receive controller is operatively connected to the receive radio-frequency switch, to the receive gain control, to the receive precision amplifier, and to the receive down converter.

According to the teaching of the present invention the radio-frequency module transmit including: a transmit up converter; a transmit gain control, wherein the transmit gain control is operatively connected to the transmit up converter; a transmit precision amplifier, wherein the transmit precision amplifier is operatively connected to the transmit gain control; a transmit voltage standing-wave ratio (VSWR) meter, wherein the transmit voltage standing-wave ratio meter is operatively connected to the transmit precision amplifier; a transmit radio-frequency switch wherein the transmit radio-frequency switch is operatively connected to the transmit voltage standing-wave ratio meter; and a transmit controller, wherein the transmit controller is operatively connected to the transmit up converter, to the transmit gain control, to the transmit precision amplifier, to the transmit voltage standing-wave ratio meter, and to the transmit radio-frequency switch.

According to the teaching of the present invention the transfer function estimator including: an analog to digital converter; a digital signals processor, wherein the digital signals processor is operatively connected to the analog to digital converter; and a digital to analog converter, wherein the digital to analog converter is operatively connected to the digital signals processor.

According to the teaching of the present invention there is provided a method for measurement of parameters of radio-frequency transmission devices including the stages of: generating a Gaussian white noise transmission signal in a signal generator; transmitting the Gaussian white noise transmission signal to a device under test; receiving the Gaussian white noise transmission signal after it had passed through the device under test; passing the Gaussian white noise transmission signal through a first filter; passing the received Gaussian white noise transmission signal after it had passed through the device under test through a second filter; subtracting the passed Gaussian white noise transmission signal through a first filter from the received Gaussian white noise transmission signal after it had passed through the device under test through a second filter; feed-backing the subtracted signal to the first filter; communicating between a main controller and the first filter and the second filter; monitoring the signals coming out of the first filter and the second filter; and changing the first filter parameters.

Additional objects and advantages of the invention will be set forth in part in the description which follows and, in part, will be obvious from the description, or may be learned by practice of the invention.

BRIEF DESCRIPTION OF THE DRAWINGS

The invention is herein described, by way of example only, with reference to the accompanying drawings, wherein.

Figure 1A:
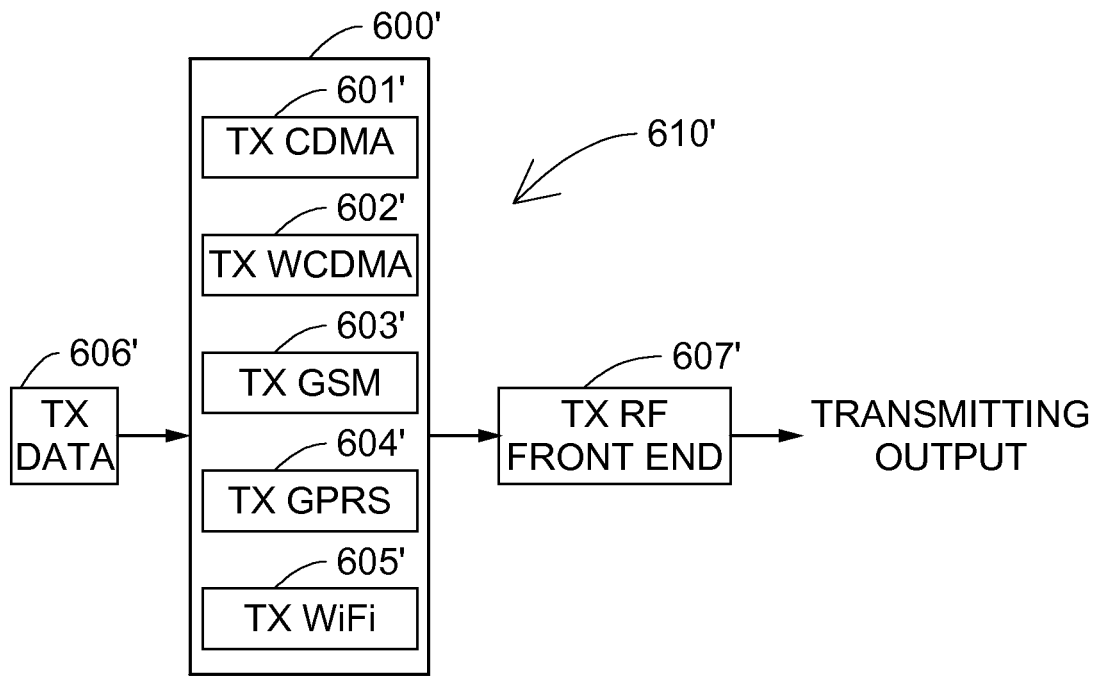
FIG. 1a of the prior art is a schematic block diagram of a transmitting path of a prior art test equipment.
Figure 1B:
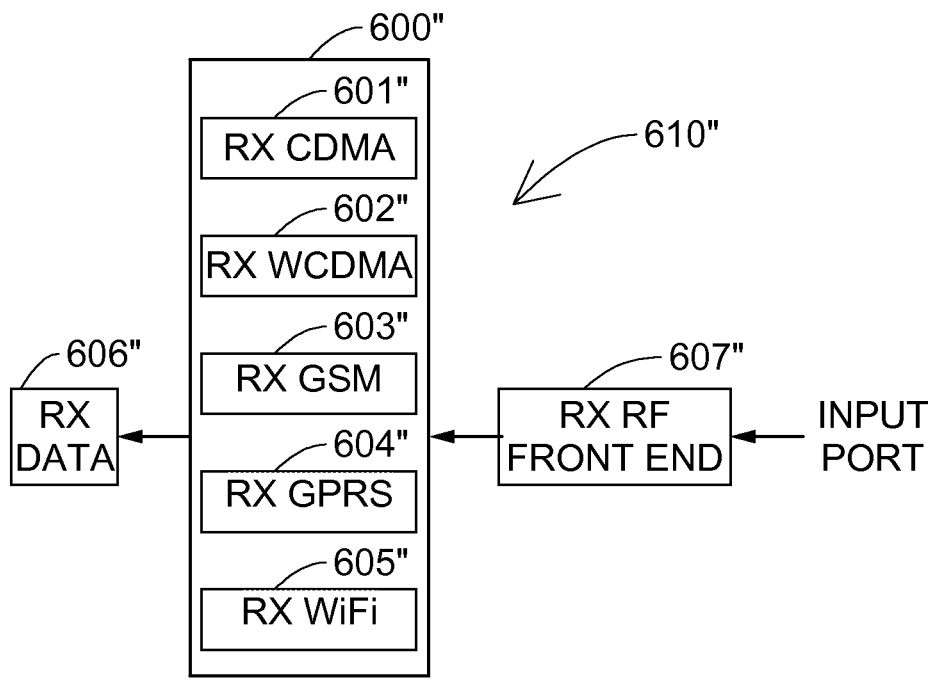
FIG. 1b of the prior art is a schematic block diagram of a receiving path of a prior art test equipment.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

DETAILED DESCRIPTION OF EMBODIMENTS

The present invention is of a system and method for measurement of parameters of radio-frequency transmission devices by utilizing a DSP.

The principles and operation of a system and method for measurement of parameters of radio-frequency transmission devices by utilizing a DSP according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings.

Unless otherwise defined, all technical and scientific terms used herein have the same meaning as commonly understood by one of ordinary skill in the art to which this invention belongs. The materials, dimensions, methods, and examples provided herein are illustrative only and are not intended to be limiting.

Figures 2, 3:
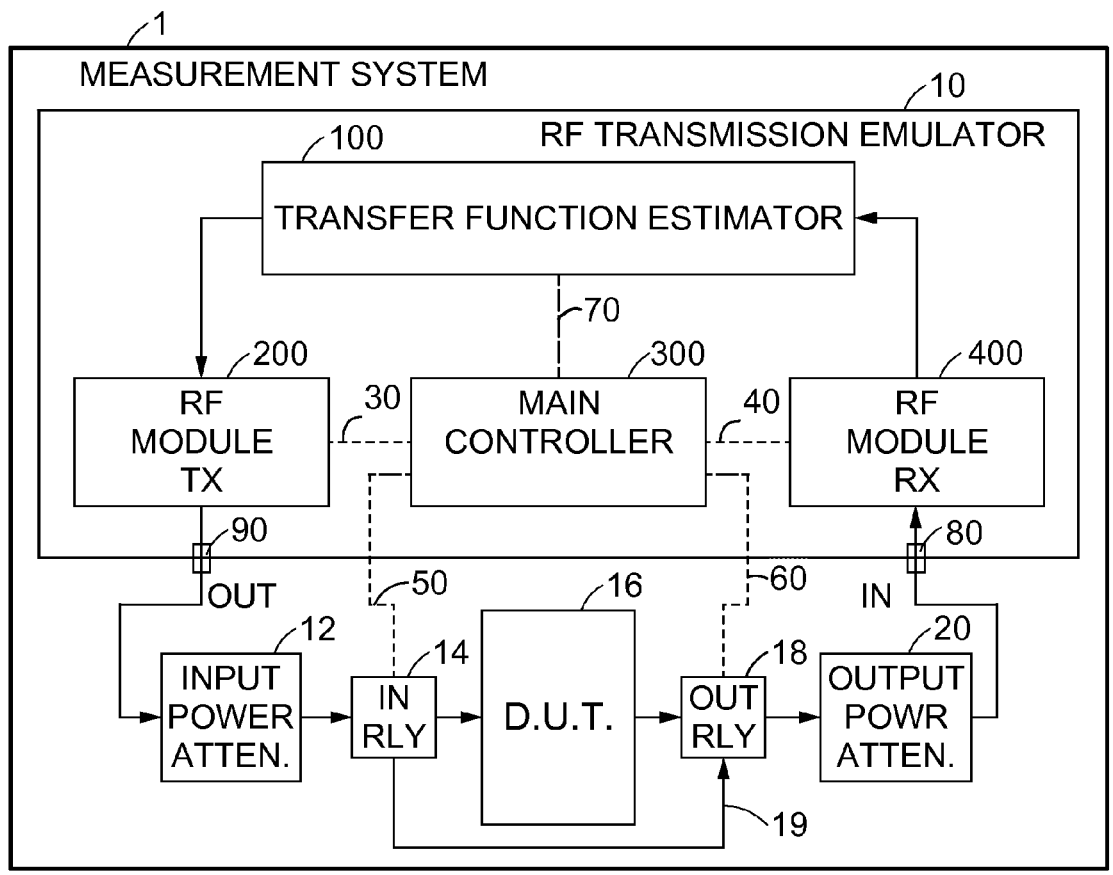
FIG. 2 is a schematic block diagram of a measurement system according to the present invention.
FIG. 3 is a schematic block diagram of a RF module Rx according to the present invention.

The following list is a legend of the numbering of the application illustrations:
1 measurement system
10 RF transmission emulator
12 input power attenuator
14 input relay
16 device under test (DUT)
18 output relay
19 bypass connection
20 output power attenuator
30 RF module Tx control line
40 RF module Rx control line
50 input relay control line
60 output relay control line
70 transfer function estimator control line
80 RF transmission emulator input port
90 RF transmission emulator output port
100 transfer function estimator
102 analog to digital converter (ADC)
102' ADC TI ADS5483
104 digital signals processor (DSP)
104' FPGA Altera Cyclone-III
106 digital to analog converter (DAC)
106' TI DAC 5682Z
106a' DAC TI channel1
106b' DAC TI channel2
108' voltage controller oscillator (VCXO)
110' clock distributor TI CDCE72010
200 RF module Tx
202 Tx up converter
204 Tx gain control
206 Tx precision amplifier
208 Tx voltage standing-wave ratio (VSWR) meter 210 Tx RF switch
212 Tx controller
300 main controller
400 RF module Rx
402 Rx RF switch
404 Rx gain control
406 Rx precision amplifier
408 Rx down converter
410 Rx controller
500 transfer function estimation algorithm
502 signal generator
504 first filter
506 adder
508 second filter
600' Tx hardware paths block
601' Tx CDMA path
602' Tx WCDMA path
603' Tx GSM path
604' Tx GPRS path
605' Tx WiFi path
606' Tx data
607' Tx RF front end
610' transmitting path
600" Rx hardware paths block
601" Rx CDMA path
602" Rx WCDMA path
603" Rx GSM path
604" Rx GPRS path
605" Rx WiFi path
606" Rx data
607" Rx RF front end
610" receiving path Referring now to the drawings, FIG. 2 is a schematic block diagram of a measurement system 1 according to the present invention.

The measurement system 1 includes a RF transmission emulator 10 that is operatively connected to an input power attenuator 12 through a RF transmission emulator output port 90. The input power attenuator 12 is operatively connected to an input relay 14 and the input relay 14 is operatively connected to a device under test (DUT) 16. The DUT 16 is operatively connected to an output relay 18 which is operatively connected to an output power attenuator 20. The output power attenuator 20 is operatively connected to the RF transmission emulator 10 through a RF transmission emulator input port 80.

The transmission emulator 10 includes a transfer function estimator 100 which receives its input from a RF module Rx 400 and transmits its output to a RF module Tx 200.

A main controller 300 (which is included in the RF transmission emulator 10) is operatively connected to the RF module Tx 200 via a RF module Tx control line 30, to the RF module Rx 400 via a RF module Rx control line 40, to the transfer function estimator 100 via a transfer function estimator control line 70, to the input relay 14 via an input relay control line 50, and to the output relay 18 via an output relay control line 60.

The input power attenuator 12 and the output power attenuator 20 are optional and can be omitted from the measurement system 1 in cases where the signals transmitted and received by the RF transmission emulator 10 and the DUT 16 have similar amplitudes and power levels. Otherwise, the attenuators are used to lower a signal's power to appropriate levels for the receiving device (either the RF transmission emulator 10 or the DUT 16).

The input relay 14 and output relay 18 enable the measurement system 1 to bypass the DUT 16 using a bypass connection 19 in order to be able to calibrate itself by transmitting and receiving a signal without the DUT's 16 influence on the measurement system 1 itself.

FIG. 3 is a schematic block diagram of a RF module Rx 400 according to the present invention.

The RF module Rx 400 receives a number of inputs which can vary in frequency ranges, bandwidths etc. (FIG. 3, describes an exemplary embodiment which includes two input signals IN1 and IN2 but any number of inputs is possible). These inputs are connected to a Rx RF switch 402 that controls which of the inputs is passed on to a Rx gain control 404 that can increase or decrease its gain, thereby increasing or decreasing the signal's amplitude and power. The Rx gain control 404 outputs a signal that is input to a Rx precision amplifier 406 that sets the signals precise amplitude and power to the desired level for the following components in the signal's flow path. A Rx down converter 408 then converts the signal from its radio frequency (RF) range to an intermediary frequency (IF) range which is better suited for the following components in the signal's flow path in the transfer function estimator 100 (not shown in the present figure, shown in FIG. 2).

All of the components in the RF module Rx 400 are controlled by a Rx controller 410 which gets its control commands from the main controller 300 (not shown in the present figure, shown in FIG. 2).

Figure 4:
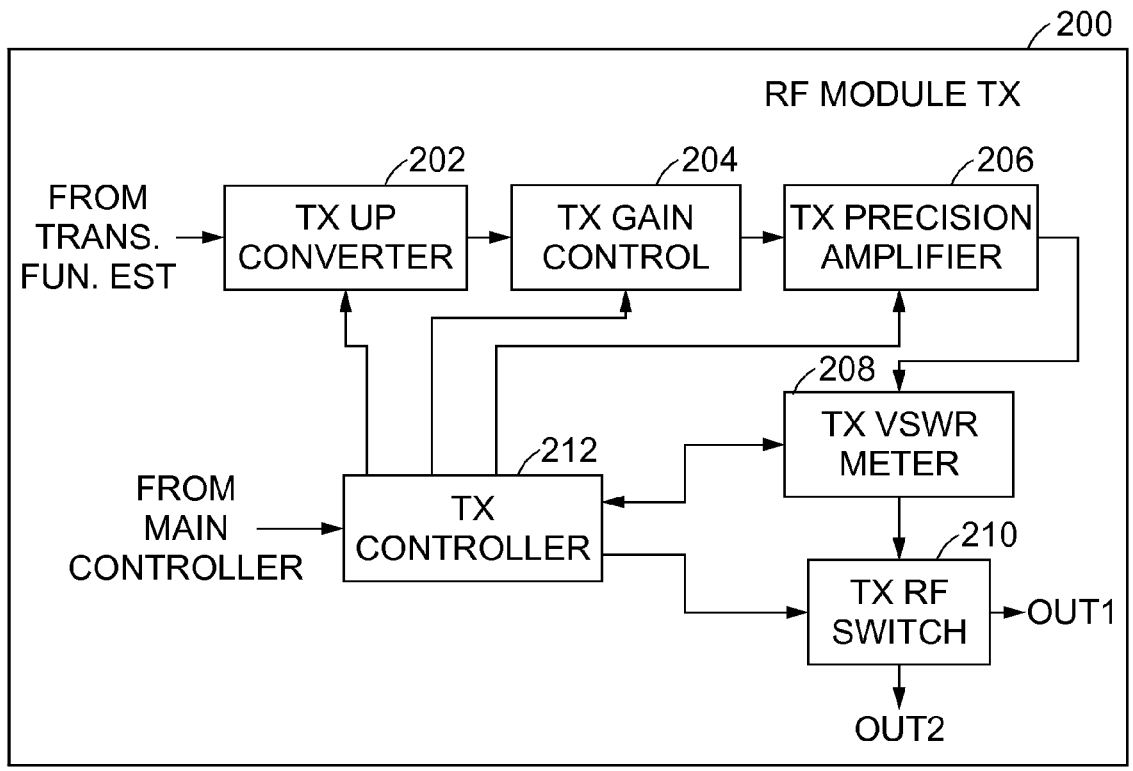
FIG. 4 is a schematic block diagram of a RF module Tx according to the present invention.

FIG. 4 is a schematic block diagram of a RF module Tx 200 according to the present invention.

The RF module Tx 200 receives its input from the transfer function estimator 100 (not shown in the present figure, shown in FIG. 2). The input signal is input to a Tx up converter 202 in order to convert it from an intermediary frequency (IF) range to the RF range. From the Tx up converter 202 the signal is input to a Tx gain control 204. The Tx gain control 204 can increase or decrease its gain, thereby increasing or decreasing the signal's amplitude and power. The Tx gain control 204 outputs a signal that is input to a Tx precision amplifier 206 that sets the signals precise amplitude and power to the desired level for the following components in the signal's flow path. From the Tx precision amplifier 206 the signal goes into a Tx voltage standing-wave ratio (VSWR) meter 208 for validation of its amplitude and power in order to be able to adjust the gain and amplification of the Tx gain control 204 and precision amplifier 206. Following the Tx VSWR meter 208 is a Tx RF switch 210 that can switch the incoming signal out to a number of outputs (FIG. 4, describes an exemplary embodiment which includes two output signals OUT1 and OUT2 however any number of outputs is possible).

All of the components in the RF module Tx 200 are controlled by a Tx controller 212, which gets its control commands from the main controller 300 (not shown in the present figure, shown in FIG. 2).

Figure 5:
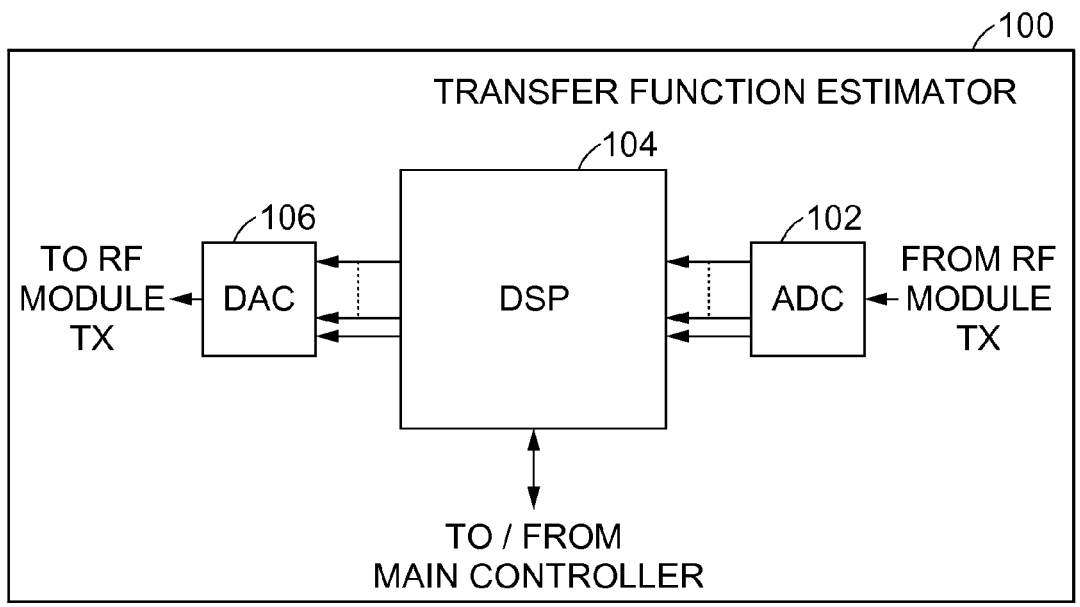
FIG. 5 is a schematic block diagram of a transfer function estimator according to the present invention.

FIG. 5 is a schematic block diagram of a transfer function estimator 100 according to the present invention.

The transfer function estimator 100 receives an input signal from the RF module Rx 400 (not shown in the present figure, shown in FIG. 2), which by its nature is an analog signal. In order to be able to perform calculations on the received signal, an analog to digital converter (ADC) 102 is used to convert the incoming analog signal into a digital representation of the analog signal. The digital signal is composed of a number of bits whose quantity is determined by the accuracy needed for the calculations.

A digital signals processor (DSP) 104 is used to calculate various parameters of the received signal according to commands coming from the main controller 300 (not shown in the present figure, shown in FIG. 2). The calculations results are sent to the main controller 300 (not shown in the present figure, shown in FIG. 2) which can decide whether the DUT 16 (not shown in the present figure, shown in FIG. 2) passed or failed the test.

The DSP 104 can also be used to stimulate the DUT 16 by creating various signals that can be input to the DUT 16. Such signals are output from the DSP 104 as a digital signal with a certain number of bits determined by the accuracy needed. The digital signal is input to a digital to analog (DAC) 106 where it is converted to an analog signal and output to the RF module Tx 200 (not shown in the present figure, shown in FIG. 2).

Figure 6:
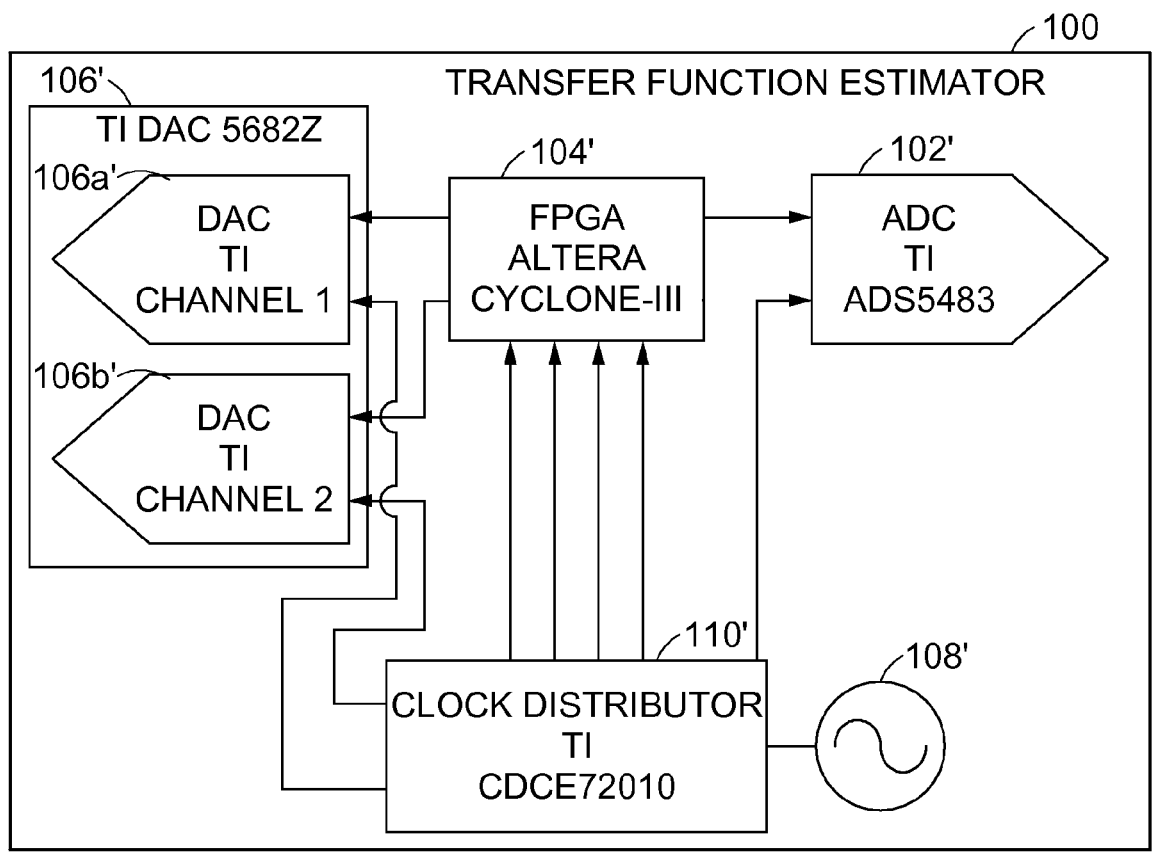
FIG. 6 is a schematic block diagram of one specific implementation of a transfer function estimator using existing, commercially available components according to the present invention.

FIG. 6 is a schematic block diagram of one specific implementation of a transfer function estimator 100 using existing, commercially available components according to the present invention.

In the present figure, the ADC 102 is implemented with an ADC TI ADS5483 102' device, the DSP 104 is implemented with an FPGA Altera Cyclone-III 104' device and the DAC 106 is implemented with a TI DAC 5682Z 106' device.

Additionally, this implementation requires the use of a voltage controller oscillator (VCXO) 108' and a clock distributor TI CDCE72010 110' to supply the same clock signal to the various components within the transfer function estimator 100.

The TI DAC 5682Z 106' contains two DAC channels; the DAC TI channel1 106a' and DAC TI channel2 106b' either of which can be used as the DAC 106.

It should be noted that this specific implementation is only one possible implementation of the present invention and is not intended to limit the present invention.

Figure 7:
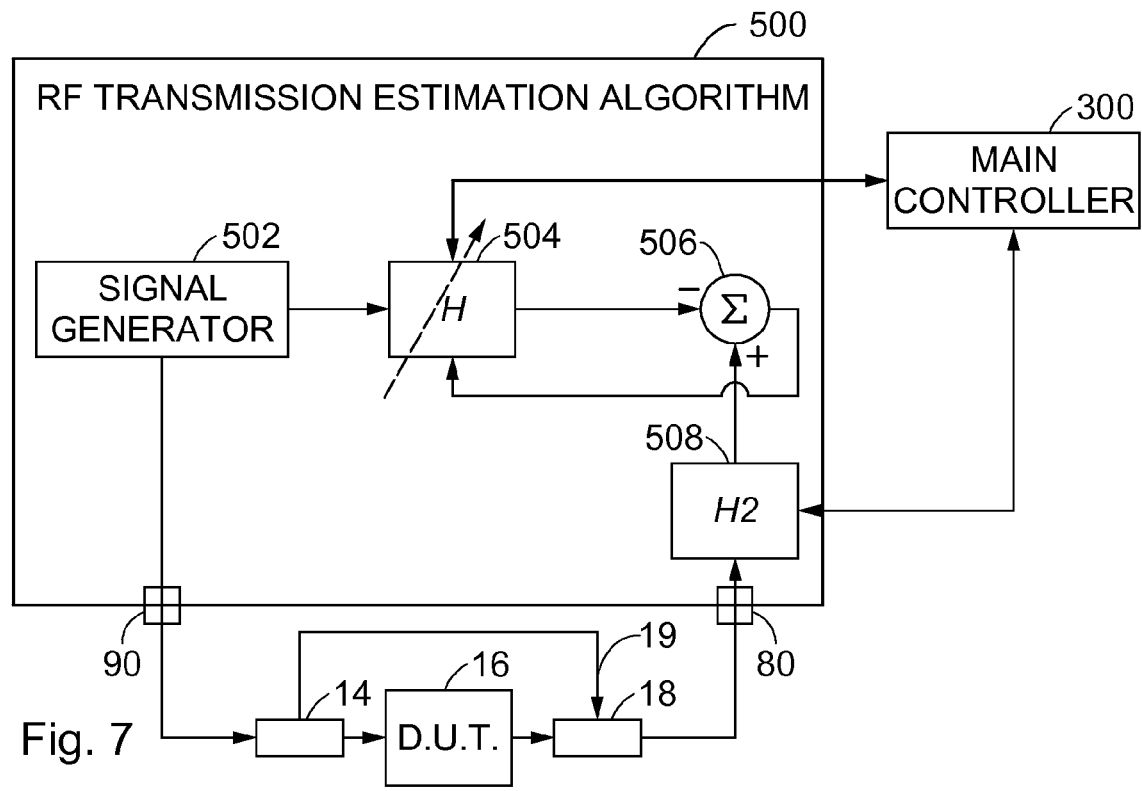
FIG. 7 is a schematic block diagram of the RF transmission estimation algorithm according to the present invention.

FIG. 7 is a schematic block diagram of the RF transmission estimation algorithm 500 according to the present invention.

The RF transmission estimation algorithm 500 starts by generating a Gaussian white noise (GWN) transmission signal in a signal generator 502 which is transmitted via the output port 90, input relay 14, DUT 16, output relay 18 and received in the input port 80. Optionally, the input relay 14 and output relay 18 can bypass the DUT 16.

The WGN transmission signal goes through a first filter 504 into an adder 506. The signal coming in through the input port 80 goes through a second filter 508 into the adder 506. The adder 506 subtracts the two signals and input the resultant signal back to the first filter 504.

The main controller 300 communicates with both the first filter 504 and the second filter 508 to control the first filter 504 parameters and monitor the signals coming out of the two filters. By changing the first filter 504 parameters, the main controller 300 can decrease the RMS error between the two signals coming out of the two filters. Once minimal RMS error is achieved, the first filter 504 parameters represent the DUT's 16 estimated transfer function.

This algorithm is sometimes known as Least Mean Square (LMS) algorithm. The LMS algorithm can estimate a DUT's 16 transfer function in its linear sections. For the non-linear sections of the transfer functions, the well known 2-tone IMD level and an input power\output power (Pi\Po) curve algorithm can be used to estimate the DUT's 16 non linear transfer function.

Once the transfer function is estimated, the main controller 300 can run off-line simulations using a digital signal processing software (such as MATLAB by MathWorks). The offline simulation software has an Rx part (transmitter) and a Tx part (receiver). It simulates various communication protocols to generate (simulated) analog signals. Then these signals are passed (digitally) through the estimated transfer function to obtain the Rx signals. The Rx signals are analyzed to obtain test results.

Comparing the simulation results with the standards' requirements show whether the DUT is compliant with the standard or not.

It should be noted that using the estimated transfer function estimator 100 other parameters of the DUT 16 can be obtained such as: gain, flatness, phase and group delay, phase and group delay variations, frequency response, filters rejection etc.

The signal generator 502, first filter 504, adder 506, and second filter 508 are normally implemented within the transfer function estimator 100 (not shown in the present figure, shown in FIG. 2), usually in the DSP 104 (not shown in the present figure, shown in FIG. 5).

The present figure omits certain components described in previous figures for clarity purposes only and does not intend to omit them from the present invention.

The RF transmission estimation algorithm 500 is used as a basis of a method for measurement of parameters of radio-frequency transmission devices which includes the following steps:

(i) generating a Gaussian white noise transmission signal in a signal generator;

(ii) transmitting the Gaussian white noise transmission signal to the device under test;

(iii) receiving the Gaussian white noise transmission signal after it had passed through the device under test;

(iv) passing the Gaussian white noise transmission signal through the first filter;

(v) passing the received Gaussian white noise transmission signal after it had passed through the device under test through the second filter;

(vi) subtracting the passed Gaussian white noise transmission signal through the first filter from the received Gaussian white noise transmission signal after it had passed through the device under test through the second filter;

(vii) feed-backing the subtracted signal to the first filter;

(viii) communicating between the main controller and the first filter and the second filter;

(ix) monitoring the signals coming out of the first filter and the second filter; and (x) changing the first filter parameters.

While the invention has been described with respect to a limited number of embodiments, it will be appreciated that many variations, modifications and other applications of the invention may be made.

What is claimed is:

1. A system for measurement of parameters of radio-frequency transmission devices comprising:
   (a) a radio-frequency transmission emulator comprising a signal generator, a first filter and a second filter;
   (b) an input power attenuator, wherein said input power attenuator is operatively connected to said radio-frequency transmission emulator;
   (c) a device under test, wherein said device under test is operatively connected to said input power attenuator;
   (d) an output power attenuator, wherein said output power attenuator is operatively connected to said device under test and to said radio-frequency transmission emulator, and
   (e) a processor, said processor being configured to perform the steps of:
      (i) generating a Gaussian white noise transmission signal in the signal generator;

(ii) passing said Gaussian white noise transmission signal through the first filter;
(iii) transmitting said Gaussian white noise transmission signal to the device under test;
(iv) receiving said Gaussian white noise transmission signal after passing through said device under test;
(v) passing said received Gaussian white noise transmission signal after it had passed through said device under test through the second filter;
(vi) subtracting said passed Gaussian white noise transmission signal through the first filter from said received Gaussian white noise transmission signal after passing through said device under test through the second filter;
(vii) feed-backing said subtracted signal to said first filter;
(viii) communicating between a main controller and said first filter and said second filter;
(ix) monitoring the signals coming out of said first filter and said second filter; and
(x) changing said first filter parameters.

2. The system for measurement of parameters of radio-frequency transmission devices of claim 1, further comprising:
an input relay, wherein said input relay is operatively connected to said input power attenuator and to said device under test;
an output relay, wherein said output relay is operatively connected to said device under test and to said radio-frequency transmission emulator; and
a bypass connection operatively connected to said input relay and to said output relay.

3. The system for measurement of parameters of radio-frequency transmission devices of claim 2, wherein said radio-frequency transmission emulator includes:
a transfer function estimator;
a radio-frequency module transmit, wherein said radio-frequency module transmit is operatively connected to said transfer function estimator;
a radio-frequency transmission emulator output port, wherein said radio-frequency transmission emulator output port is operatively connected to said radio-frequency module transmit;
a radio-frequency transmission emulator input port;
a radio-frequency module receive, wherein said radio-frequency module receive is operatively connected to said radio-frequency transmission emulator input port and to said transfer function estimator; and
a main controller, wherein said main controller is operatively connected to said transfer function estimator by a transfer function estimator control line, to said radio-frequency module transmit by a radio-frequency module transmit control line, to said input relay by an input relay control line, to said output relay by an output relay control line, and to said radio-frequency module receive by a radio-frequency module receive control line.

4. The system for measurement of parameters of radio-frequency transmission devices of claim 3, wherein said radio-frequency module receive including:
a receive radio-frequency switch;
a receive gain control, wherein said receive gain control is operatively connected to said receive radio-frequency switch;
a receive precision amplifier, wherein said receive precision amplifier is operatively connected to said receive gain control;
a receive down converter, wherein said receive down converter is operatively connected to said receive precision amplifier; and
a receive controller, wherein said receive controller is operatively connected to said receive radio-frequency switch, to said receive gain control, to said receive precision amplifier, and to said receive down converter.

5. The system for measurement of parameters of radio-frequency transmission devices of claim 3, wherein said radio-frequency module transmit including:
a transmit up converter;
a transmit gain control, wherein said transmit gain control is operatively connected to said transmit up converter;
a transmit precision amplifier, wherein said transmit precision amplifier is operatively connected to said transmit gain control;
a transmit voltage standing-wave ratio (VSWR) meter, wherein said transmit voltage standing-wave ratio (VSWR) meter is operatively connected to said transmit precision amplifier;
a transmit radio-frequency switch wherein said transmit radio-frequency switch is operatively connected to said transmit voltage standing-wave ratio (VSWR) meter; and
a transmit controller, wherein said transmit controller is operatively connected to said transmit up converter, to said transmit gain control, to said transmit precision amplifier, to said transmit voltage standing-wave ratio (VSWR) meter, and to said transmit radio-frequency switch.

6. The system for measurement of parameters of radio-frequency transmission devices of claim 3 wherein said transfer function estimator includes:
an analog to digital converter;
a digital signals processor, wherein said digital signals processor is operatively connected to said analog to digital converter; and
a digital to analog converter, wherein said digital to analog converter is operatively connected to said digital signals processor.

\* \* \* \* \*